(12) United States Patent
Kuo et al.

(10) Patent No.: US 10,666,175 B2
(45) Date of Patent: May 26, 2020

(54) SWITCHING DEVICE AND WIND TURBINE SYSTEM INCLUDING THE SAME

(71) Applicants: Toyo Seki (Taiwan) Co., Ltd., Taichung (TW); Chun-Lin Kuo, Taichung (TW); Po-Chia Kuo, Taichung (TW)

(72) Inventors: Po-Yuan Kuo, Taichung (TW); Chun-Lin Kuo, Taichung (TW); Po-Chia Kuo, Taichung (TW)

(73) Assignees: TOYO SEKI (TAIWAN) CO., LTD., Taichung (TW); Chun-Lin Kuo, Taichung (TW); Po-Chia Kuo, Taichung (TW)

( * ) Notice: Subject to any disclaimer, the term of this patent is extended or adjusted under 35 U.S.C. 154(b) by 529 days.

(21) Appl. No.: 15/677,332

(22) Filed: Aug. 15, 2017

(65) Prior Publication Data

US 2018/0342969 A1   Nov. 29, 2018

(30) Foreign Application Priority Data

May 23, 2017   (CN) .......................... 2017 1 0368296

(51) Int. Cl.
*H02P 9/48* (2006.01)
*F03D 9/25* (2016.01)
(Continued)

(52) U.S. Cl.
CPC .............. *H02P 9/48* (2013.01); *F03D 7/0284* (2013.01); *F03D 9/25* (2016.05); *F03D 17/00* (2016.05); *H02K 1/2793* (2013.01); *H02K 7/116* (2013.01); *H02K 7/183* (2013.01); *H02K 21/24* (2013.01); *H02M 1/32* (2013.01); *H02M 3/155* (2013.01); *H02M 7/06* (2013.01); *F03D 80/82* (2016.05);
(Continued)

(58) Field of Classification Search
CPC .......... H02P 9/48; H02P 2101/15; H02P 9/00; F03D 7/0284; F03D 17/00; F03D 9/25; H02K 21/24; H02K 7/183; H02M 1/32; H02M 2001/007; H02M 2003/1557; F05B 2270/335; F05B 2220/706
See application file for complete search history.

(56) References Cited

U.S. PATENT DOCUMENTS

2007/0121354 A1 * 5/2007 Jones ...................... H02P 9/102
                                                        363/47
2011/0140421 A1 * 6/2011 Scholte-Wassink ........................
                                                        H02P 25/188
                                                        290/44

(Continued)

*Primary Examiner* — Rexford N Barnie
*Assistant Examiner* — Terrence R Willoughby
(74) *Attorney, Agent, or Firm* — Birch, Stewart, Kolasch & Birch, LLP (57) ABSTRACT

A wind turbine system includes a wind turbine and switching devices. Each switching device is for stabilizing an electric output of a coil of the wind turbine, and includes a voltage converter circuit, a switch circuit electrically connected between the voltage converter circuit and an output interface, and a controller circuit. The controller circuit is configured to calculate an input electric power of input electricity into the voltage converter circuit, to calculate an output electric power of output electricity outputted by the voltage converter circuit, and to control the switch circuit to operate in one of a closed state and an open state according to the input electric power and the output electric power.

20 Claims, 5 Drawing Sheets (51) Int. Cl.
*F03D 17/00* (2016.01)
*H02M 3/155* (2006.01)
*H02M 7/06* (2006.01)
*H02K 1/27* (2006.01)
*H02K 7/18* (2006.01)
*H02K 7/116* (2006.01)
*H02M 1/32* (2007.01)
*H02K 21/24* (2006.01)
*F03D 7/02* (2006.01)
*F03D 80/80* (2016.01)
*H02P 101/15* (2016.01)
*H02M 1/00* (2006.01)

(52) U.S. Cl.
CPC .............. *F05B 2220/706* (2013.01); *F05B 2260/40311* (2013.01); *F05B 2270/335* (2013.01); *H02M 2001/007* (2013.01); *H02M 2003/1557* (2013.01); *H02P 2101/15* (2015.01)

(56) References Cited

U.S. PATENT DOCUMENTS

| | | | |
|---|---|---|---|
| 2012/0061966 A1* | 3/2012 | Ito | H02P 3/22 290/44 |
| 2012/0063900 A1* | 3/2012 | Kestermann | F03D 7/0224 416/147 |
| 2012/0221159 A1* | 8/2012 | Olesen | F03D 7/0284 700/292 |
| 2014/0191507 A1* | 7/2014 | Holmberg | H02J 3/46 290/44 |
| 2016/0032896 A1* | 2/2016 | Barton | F03D 9/255 290/44 |
| 2016/0146191 A1* | 5/2016 | Berroteran Gil | H02P 9/007 290/44 |
| 2017/0009738 A1* | 1/2017 | Brogan | F03D 9/255 |
| 2018/0112647 A1* | 4/2018 | Abeyasekera | H02H 7/26 |
| 2018/0291870 A1* | 10/2018 | Theopold | F03D 7/0224 |

\* cited by examiner

SWITCHING DEVICE AND WIND TURBINE SYSTEM INCLUDING THE SAME

CROSS-REFERENCE TO RELATED APPLICATION

This application claims priority of Chinese Patent Application No. 201710368296.6, filed on May 23, 2017.

FIELD

The disclosure relates to a switching device and a wind turbine system including the same, and more particularly to a switching device for stabilizing an electric output of a wind turbine.

BACKGROUND

In recent years, because of the limited reserves of petroleum on Earth, green energy technology has been developed quickly. Particularly, wind power, as an alternative to energy from fossil fuels, is one of the main research subjects because it uses air flow to generate electric power and does not produce environmental pollution during operation.

Figure 1:
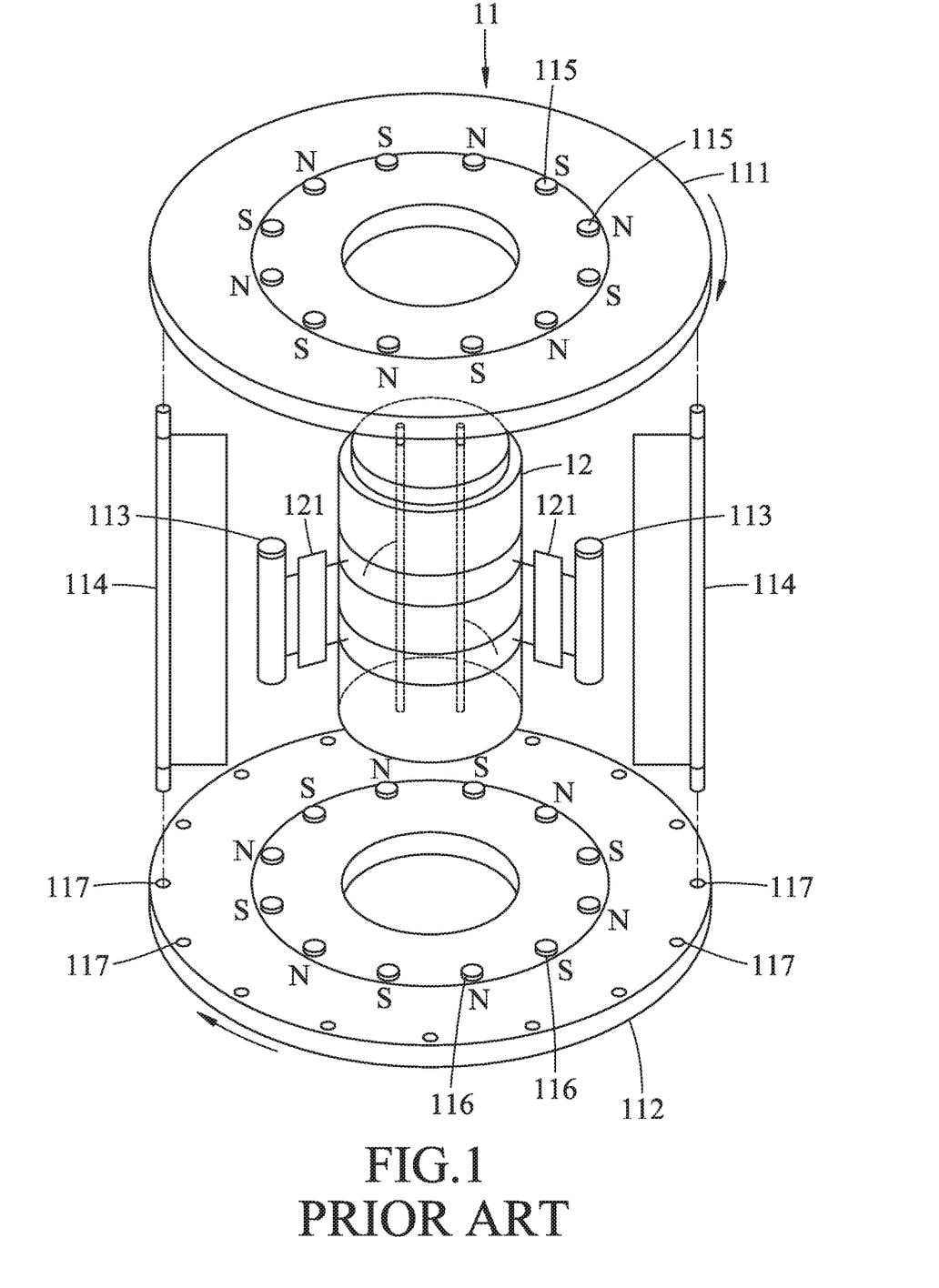
FIG. 1 is a perspective exploded schematic view of a conventional wind turbine system.

Referring to FIG. 1, a conventional wind turbine system includes a wind turbine 11 and a circuit unit 12. The wind turbine 11 includes a first board 111, a second board 112 formed with a plurality of mounting holes 117, a plurality of coils 113, a plurality of blades 114, a plurality of first magnetic elements 115 mounted on the first board 111, and a plurality of second magnetic elements 116 mounted on the second board 112. The circuit unit 12 includes a plurality of processing circuits 121 electrically connected to the coils 113, respectively.

The coils 113 and the blades 114 are arranged annularly so as to surround the circuit unit 12. A number of the coils 113 is equal to a number of the second magnetic elements 116, and is also equal to a number of the first magnetic elements 115. The blades 114 engage with the mounting holes 117, respectively, and a number of the blades 114 is equal to a number of the mounting holes 117. For the sake of clarity, only two of the blades 114 are shown in FIG. 1 for illustration.

When the blades 114 are driven to rotate by wind, the first board 111 and the second board 112 rotate along with the blades 114, and the first and second magnetic elements 115, 116 also rotate around the circuit unit 12 and have relative motion with respect to the coils 114 that are not moving. As a result, each of the coils 114 generates an electric output due to magnetic induction and outputs the same to a corresponding one of the processing circuits 121, and then, the corresponding one of the processing circuits 121 processes the electric output and provides processed electric output to a load (not shown).

However, because of variations among the coils 114, phases of the electric outputs generated by the coils and power generating efficiency of the coils 113 may be different. Furthermore, the phase differences among the electric outputs may result in internal energy loss, and overall efficiency of electricity generation of the conventional wind turbine system may decrease.

SUMMARY

Therefore, an object of the disclosure is to provide a switching device to be connected to a wind turbine for stabilizing an electric output of the wind turbine.

According to the disclosure, the switching device includes a rectifier circuit, a voltage converter circuit, a switch circuit, an output interface and a controller circuit.

The rectifier circuit is configured to be electrically connected to the wind turbine for receiving the electric output therefrom, to convert the electric output into input electricity having an input voltage value and an input current value, and to output the input electricity.

The voltage converter circuit has an output node, and an input node that is electrically connected to the rectifier circuit for receiving the input electricity therefrom. The voltage converter circuit is configured to convert the input electricity into output electricity having an output voltage value and an output current value, and to output the output electricity via the output node.

The switch circuit is electrically connected between the output node and a ground, and is operable to switch between a closed state and an open state.

The output interface is electrically connected to the output node for outputting the output electricity.

The controller circuit is electrically connected to the switch circuit, the input node and the output node. The controller circuit is configured to measure the input voltage value and the input current value of the input electricity, and the output voltage value and the output current value of the output electricity. The controller circuit is further configured to calculate an input electric power based on the input voltage value and the input current value, to calculate an output electric power based on the output voltage value and the output current value, and to control the switch circuit to operate in one of the closed state and the open state according to the input electric power and the output electric power.

Another object of the disclosure is to provide a wind turbine system that can alleviate at least one of the drawbacks of the prior art.

According to the disclosure, the wind turbine system includes a wind turbine and a plurality of switching devices. The wind turbine includes a plurality of coils. Each of the coils is capable of providing an electric output.

Each of the switching devices is electrically connected to a respective one of the coils for stabilizing the electric output of the respective one of the coils.

Each of the switching devices includes a rectifier circuit, a voltage converter circuit, a switch circuit, an output interface and a controller circuit.

The rectifier circuit is electrically connected to the wind turbine for receiving the electric output therefrom, and is configured to convert the electric output into input electricity having an input voltage value and an input current value and to output the input electricity.

The voltage converter circuit has an output node, and an input node that is electrically connected to the rectifier circuit for receiving the input electricity therefrom. The voltage converter circuit is configured to convert the input electricity into output electricity having an output voltage value and an output current value, and to output the output electricity via the output node.

The switch circuit is electrically connected between the output node and a ground, and is operable to switch between a closed state and an open state.

The output interface is electrically connected to the output node for outputting the output electricity.

The controller circuit is electrically connected to the switch circuit, the input node and the output node. The controller circuit is configured to measure the input voltage value and the input current value of the input electricity, and the output voltage value and the output current value of the output electricity. The controller circuit is further configured to calculate an input electric power based on the input voltage value and the input current value, to calculate an output electric power based on the output voltage value and the output current value, and to control the switch circuit to operate in one of the closed state and the open state according to the input electric power and the output electric power.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 2:
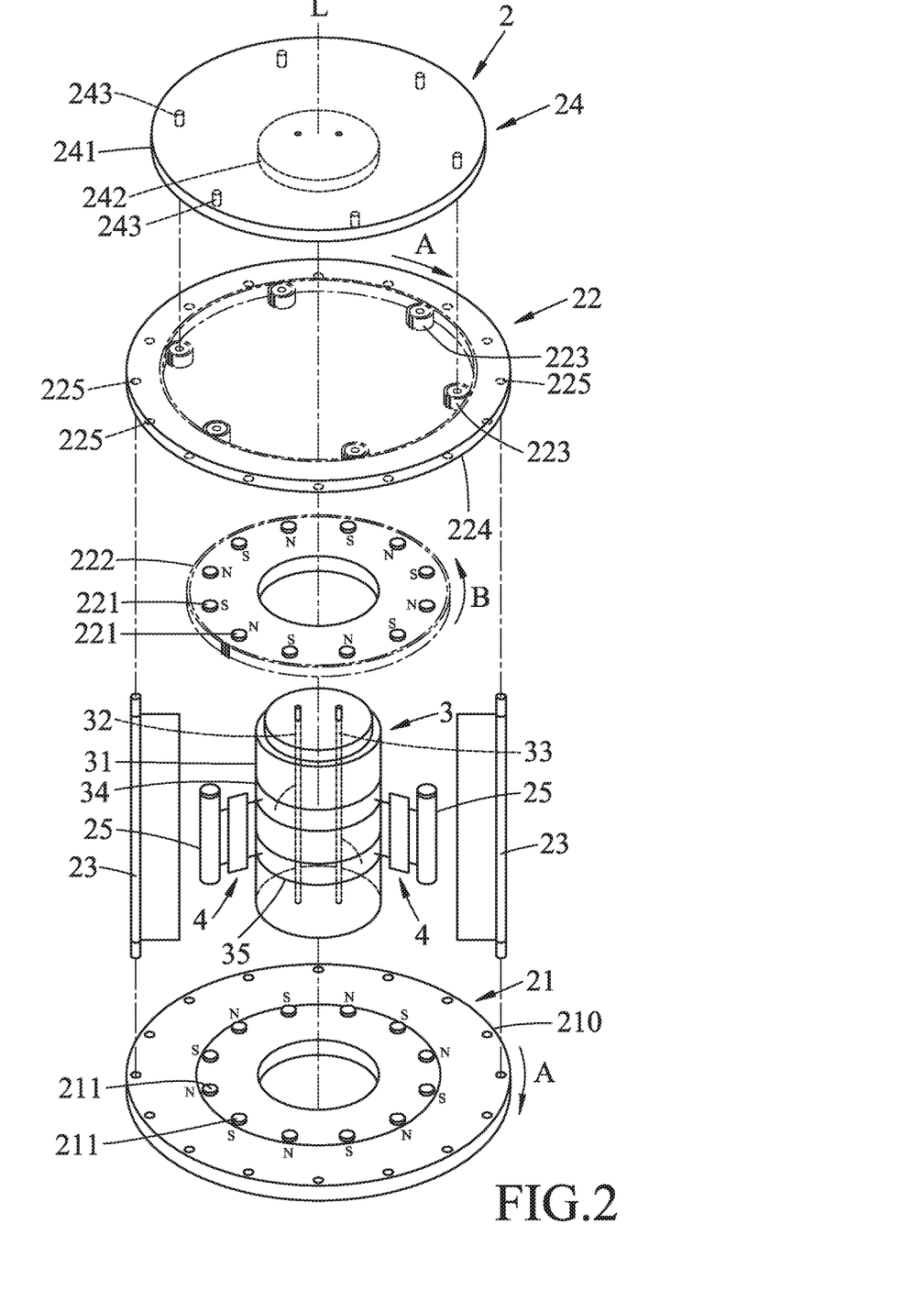
FIG. 2 is a perspective exploded schematic view of a wind turbine system according to one embodiment of the disclosure.
Figure 3:
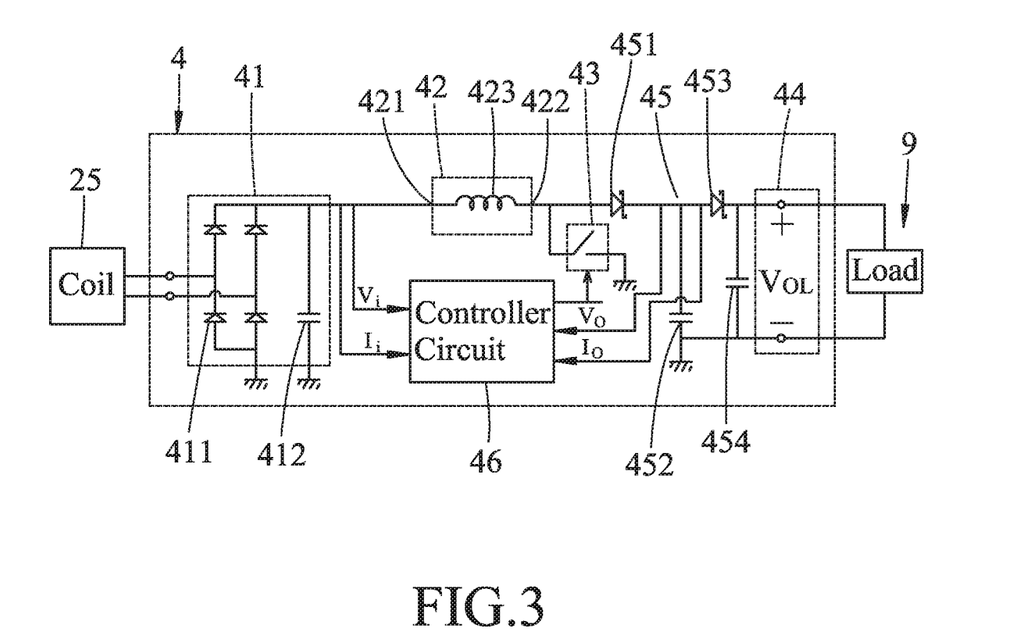
FIG. 3 is a schematic circuit diagram illustrating a switching device included in the wind turbine system.

Referring to FIGS. 2 and 3, a wind turbine system 2 according to one embodiment of the disclosure is shown. The wind turbine system includes a wind turbine 2, a transmission shaft 3 and a plurality of switching devices 4.

The wind turbine 2 includes a first board module 21, a second board module 22, turbine blades 23, a mounting board module 24 and a plurality of coils 25.

The mounting board module 24 includes a mounting board 241, a sun-gear shaft 242 and a plurality of planet-gear shafts 243. The mounting board 241 is aligned with the second board module 22 along an axis (L), and not co-rotatable with the first board module 21 and the second board module 22. The sun-gear shaft 242 is disposed on the mounting board 241 at a central position, through which the axis (L) extends. The planet-gear shafts 243 are disposed on the mounting board 241 around the sun-gear shaft 242.

The first board module 21 includes a first board 210, and a plurality of first magnetic elements 211 disposed on the first board 210 and arranged around the axis (L). The first magnetic elements 211 are arranged in a manner that an imaginary line extending through two magnetic poles of each of the first magnetic elements 211 is substantially parallel with the axis (L), and that any adjacent two of the first magnetic elements 211 have respective magnetic fields with opposite directions.

The second board module 22 is spaced apart from and aligned with the first board module 21 along the axis (L), and includes a plurality of second magnetic elements 221, a sun gear 222, a plurality of planet gears 223 and a ring gear 224. The second magnetic elements 221 are disposed on the sun gear 222, and are arranged around the axis (L). The second magnetic elements 221 are arranged in a manner that an imaginary line extending through two magnetic poles of each of the second magnetic elements 221 is substantially parallel with the axis (L), and that any adjacent two of the second magnetic elements 221 have respective magnetic fields with opposite directions. The sun gear 222 is rotatably mounted on the sun-gear shaft 242. The planet gears 223 are rotatably mounted on the planet gear shafts 243, respectively, and are engaged with the sun gear 222. The ring gear 224 is engaged with the planet gears 223, and is formed with a plurality of mounting holes 225.

The turbine blades 23 are attached between the first board module 21 and the second board module 22. In particular, the turbine blades 23 are partially inserted in the mounting holes 225, respectively. The turbine blades 23 are configured to be driven by wind force to rotate the first and second board modules 21, 22 together. In particular, the turbine blades 23 drive the ring gear 224 to rotate when driven by wind force. The turbine blades 23 are arranged annularly around the axis (L). It should be noted that a number of the turbine blades 23 is equal to a number of the mounting holes 225. For the sake of clarity, only two of the turbine blades 23 are shown in FIG. 2 for illustration.

The coils 25 are disposed between the first board module 21 and the second board module 22, and do not co-rotate with the first board module 21 and the second board module 22. The coils 25 are arranged annularly around the axis (L). Each of the coils 25 has two opposite ends corresponding to the first magnetic elements 211 and the second magnetic elements 221 in position. Namely, one of the opposite ends of each coil 25 points to the first board 210, and the other one of the opposite ends points to the sun gear 222. Each of the coils 25 is capable of providing an electric output when the first and the second board modules 21, 22 are driven to rotate by the turbine blades 23. It should be noted that a number of the coils 25 is equal to a number of the first magnetic elements 211, and is also equal to a number of the second magnetic elements 221. For the sake of clarity, only two of the coils 25 are shown in FIG. 2 for illustration.

The transmission shaft 3 does not co-rotate with the first and second board modules 21, 22, and includes a shaft body 31 having an outer surrounding surface, a positive electrode rod 32, a negative electrode rod 33, a positive electrode ring 34 and a negative electrode ring 35. The positive electrode rod 32 and the negative electrode rod 33 extend through the shaft body 31, and penetrate the mounting board module 24, so that the wind turbine 2 is capable of being electrically connected to a load 9 or to other wind turbines in series through the positive electrode rod 32 and the negative electrode rod 33. The positive electrode ring 34 and the negative electrode ring 35 are both disposed on the outer surrounding surface of the shaft body 31, and are electrically connected to the positive electrode rod 32 and the negative electrode rod 33, respectively.

Each of the switching devices 4 is electrically connected between a respective one of the coils 25 and the shaft body 31, and is configured for stabilizing the electric output of the respective one of the coils 25. Particularly, the electric output of each of the coils 25 is processed by the switching devices 4, and then, outputted, for example, to the load 9, via the positive and negative electrode rings 34, 35 and the positive and negative electrode rods 32, 33. Each of the switching devices 4 includes a rectifier circuit 41, a voltage converter circuit 42, a switch circuit 43, an output interface 44, a protection circuit 45 and a controller circuit 46. The switching devices 4 correspond to the coils 25, respectively; that is to say, a number of the switching devices 4 is equal to the number of the coils 25. For the sake of clarity, only two of the switching devices 4 are shown in FIG. 2.

The rectifier circuit 41 includes a bridge rectifier 411 and a filter capacitor 412, and is electrically connected to the coil 25 the wind turbine 2 for receiving the electric output therefrom. The rectifier circuit 41 is configured to convert the electric output into input electricity having an input voltage value ($V_i$) and an input current value ($I_i$), and to output the input electricity.

The voltage converter circuit 42 has an output node 422, and an input node 421 that is electrically connected to the rectifier circuit 41 for receiving the input electricity therefrom. The voltage converter circuit 42 is configured to convert the input electricity into output electricity having an output voltage value ($V_o$) and an output current value ($I_o$), and to output the output electricity via the output node 422. In this embodiment, the voltage converter circuit 42 is, but not limited to, a boost converter and includes an inductor 423. It should be noted that the voltage converter circuit 42 is not limited to the above configuration, and may include other components according to different requirements.

The switch circuit 43 is electrically connected between the output node 422 and a ground, and is operable to switch between a closed state and an open state.

The output interface 44 is electrically connected to the output node 422 for outputting the output electricity. For example, the output interface 44 includes a positive terminal (+) and a negative terminal (−) electrically connected to the positive electrode ring 34 and the negative electrode ring 35, respectively, and outputs the output electricity to the load 9 through the positive and negative electrode rings 34, 35 and the positive and negative electrode rods 32, 33.

The protection circuit 45 includes a first diode 451, a grounded capacitor 452, a second diode 453 and an output capacitor 454. The first diode 451 has a cathode, and an anode electrically connected to the output node 422 of the voltage converter circuit 42. The grounded capacitor 452 is electrically connected between the cathode of the first diode 451 and the ground. The second diode 453 is electrically connected between the cathode of the first diode 451 and the output interface 44. In particular, the second diode 453 has an anode and a cathode electrically connected to the cathode of the first diode 451 and the output interface 44, respectively. The output capacitor 454 is electrically connected in parallel with the output interface 44, and between the cathode of the second diode 453 and the ground.

The controller circuit 46 is electrically connected to the switch circuit 43, and the input node 421 and the output node 422 of the voltage converter circuit 42, and is configured to measure the input voltage value ($V_i$) and the input current value ($I_i$) of the input electricity, and the output voltage value ($V_o$) and the output current value ($I_o$) of the output electricity. The controller circuit 46 is further configured to calculate an input electric power ($W_i$) based on the input voltage value ($V_i$) and the direct input current value ($I_i$), to calculate an output electric power ($W_o$) based on the output voltage value ($V_o$) and the output current value ($I_o$), and to output a control signal to the switch circuit 43 so as to control the switch circuit 43 to operate in one of the closed state and the open state according to the input electric power ($W_i$) and the output electric power ($W_o$). For example, the controller circuit 46 is a programmable logic device.

Particularly, the controller circuit 46 is configured to repeatedly calculate the input electric power ($W_i$) when the switch circuit 43 is in the closed state (i.e., the output electricity is transmitted to the output interface 44), and to control the switch circuit 43 to switch to the open state upon a change in a rate of change of the input electric power ($W_i$) from a positive value to a negative value. The controller circuit 46 calculates the input electric power ($W_i$) at successive time points with a specific interval based on the equation $$W_i = \int_0^T I_i(t) V_i(t) dt$$

where $W_i$ denotes the input electric power, $V_i$ denotes the input voltage value, $I_i$ denotes the input current value, and T denotes the specific interval.

Similarly, the controller circuit 46 is configured to repeatedly calculate the output electric power ($W_o$) when the switch circuit 43 is in the open state, and to control the switch circuit 43 to switch to the closed state upon a change in the rate of change of the output electric power ($W_o$) from a positive value to a negative value. The controller circuit 46 calculates the output electric power ($W_o$) at successive time points with a specific interval based on the equation $$W_o = \int_0^T I_o(t) V_o(t) dt$$

where $W_o$ denotes the output electric power, $V_o$ denotes the output voltage value, $I_o$ denotes the output current value, and T denotes the specific interval. It should be noted that the controller circuit 46 calculates the input electric power ($W_i$) and the output electric power ($W_o$) with the same specific interval (T) in this embodiment. However, in other embodiments, the controller circuit 46 may calculate the input electric power ($W_i$) and the output electric power ($W_o$) with different intervals.

The switching devices 4 are electrically connected to one another in parallel, so that output voltage values ($V_o$) of all of the switching devices 4 may affect one another, and the output electricity outputted by the switching devices 4 together form overall electricity which is applied to the load 9 and which has an overall voltage value ($V_{OL}$). When the overall voltage value ($V_{OL}$) of the overall electricity is greater than the output voltage value ($V_o$) of the output electricity outputted by one of the switching devices 4, the output electricity is to be blocked by the first diode 451 and can not be outputted, and the output current value ($I_o$) is zero. On the other hand, when the output voltage value ($V_o$) is greater than the overall voltage value ($V_{OL}$) of the overall electricity and a threshold voltage value of each of the first diode 451 and the second diode 453, the output electricity can be outputted to the output interference 44 through the first and second diodes 451, 453 and the output current value ($I_o$) is greater than zero.

The following provides description of detailed operation of the switching devices 4. Since the switching devices 4 operate on the same principle, only one of the switching devices 4 and a corresponding one of the coils 25 are described in the following.

When wind starts to blow through the turbine blades 23, the wind force may be relatively weak or unstable, and thus, the wind turbine 2 rotates at a low speed of rotation. Accordingly, the coil 25 begins to provide the electric output to the switching device 4, respectively, and the output voltage value ($V_o$) may be lower than the threshold voltage value of each of the first and second diodes 451, 453 at this time, so that the first and second diodes 451, 453 block the output electricity and the output current value ($I_o$) is zero at the beginning. At this time, the inductor 423 is charged by the input electricity when the switch circuit 43 is in the closed state. Then, the controller circuit 46 implements an activation procedure by controlling the switch circuit 43 to switch between the closed state and the open state repeatedly, and making successive instances of the switch circuit 43 being in the closed state have durations one longer than the immediate previous when the output current value ($I_o$) is zero until the output voltage value ($V_o$) is above the threshold voltage value of each of the first and second diodes 451, 453 as well as the overall voltage value ($V_{OL}$). Since the inductor 423 is charged by the input electricity during the closed state of the switch device 43 and discharges electricity stored therein during the open state of the switch device 43, an increase in the duration of the closed state consequentially increases the duration of charging the inductor 423 so that the output voltage value ($V_o$) is increased as well. Eventually, when the output voltage value ($V_o$) is above the threshold voltage value of each of the first and second diodes 451, 453 and the overall voltage value ($V_{OL}$), the switching device 4 can output the output electricity to the output interference 44 and the output current value ($I_o$) is greater than zero. At this time, the controller circuit 46 detects that the output current value ($I_o$) is greater than zero, and controls operation of the switch circuit 43 in the following manner.

Figure 4:
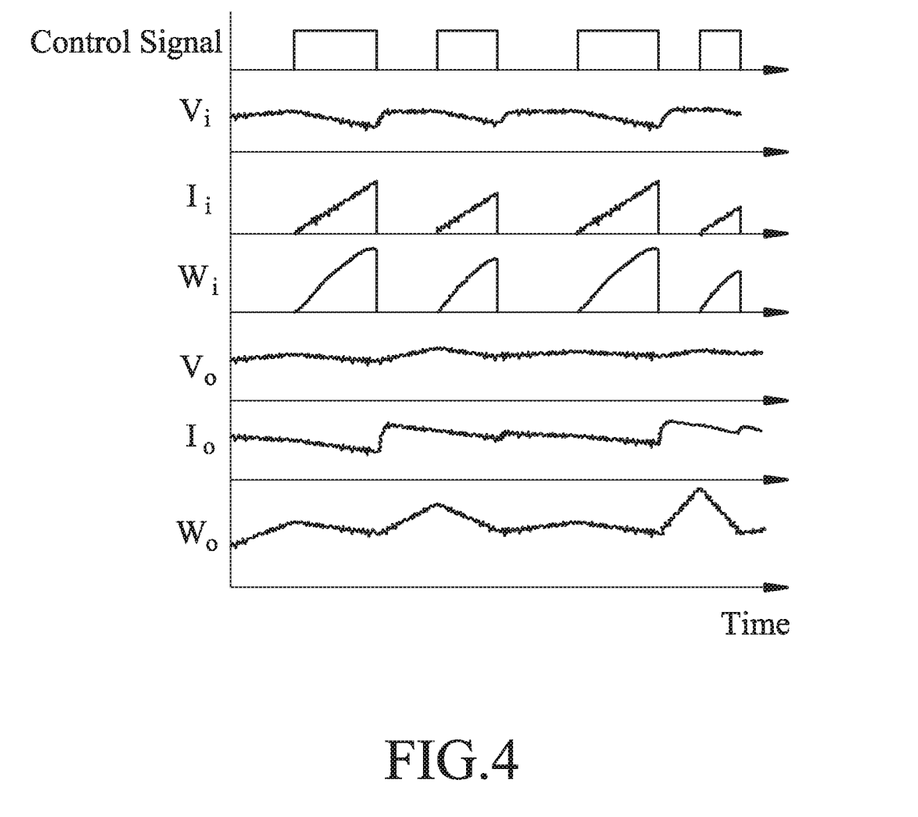
FIG. 4 is a timing diagram illustrating control signals, input current values, input voltage values, values of input electric power, output current values, output voltage values and values of output electric power.

Referring to FIGS. 3 and 4, when the controller circuit 46 detects that the output current value ($I_o$) is greater than zero, it means that the wind force is stable, and the controller circuit 46 calculates the input electric power ($W_i$) during the closed state of the switch circuit 43 and the output electric power ($W_o$) during the open state of the switch circuit 43 based on the foregoing equations.

When the controller circuit 46 outputs the control signal in a high voltage level to the switch circuit 43, the switch circuit 43 is controlled to operate in the closed state, the input current value ($I_i$) of the input electricity increases gradually and the input voltage value ($V_i$) decreases gradually as being affected by the inductor 423, so that the input electric power ($W_i$) increases gradually. When the input voltage value ($V_i$) of the input voltage decreases to a critical point making the rate of change of the input electric power ($W_i$) change from a positive value to a negative value, the controller circuit 46 immediately outputs the control signal in a low voltage level so as to control the switch circuit 43 to switch to the open state. It should be noted that, since the switch device 43 is controlled to switch between the closed state and the open state rapidly, the input current value ($I_i$) and the input electric power ($W_i$) are indicated by transient values in FIG. 4.

When the switch circuit 43 is controlled to operate in the open state, the output voltage value ($V_o$) of the output electricity increases gradually and the output current value ($I_o$) decreases gradually, so that the output electric power ($W_o$) increases. When the output current value ($I_o$) decreases to a critical point making the rate change in the output electric power ($W_o$) from a positive value to a negative value, the controller circuit 46 immediately outputs the control signal in the high voltage level to the switch circuit 43 so as to control the switch circuit 43 to switch to the closed state.

Once the wind force applied on the wind turbine 2 decreases and the output voltage value ($V_o$) is lower than the threshold voltage value or the overall voltage value ($V_{OL}$), the output current value ($I_o$) of the output electricity becomes zero again, and the controller circuit 46 implements the activation procedure to make successive instances of the switch circuit 43 being in the closed state have durations one longer than the immediate previous until the output current value ($I_o$) is greater than zero.

Figure 5:
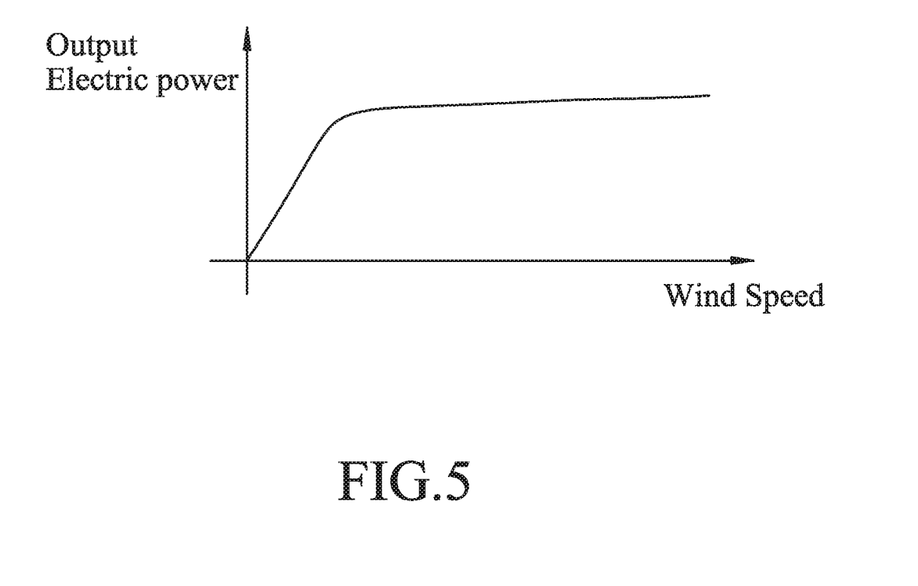
FIG. 5 is a plot illustrating a relationship between wind speed and the output electric power.

Referring back to FIG. 2, when the wind force is applied on the turbine blades 23, and it is assumed that the first board module 21 and the ring gear 224 are driven by the turbine blades 23 to rotate in a clockwise direction (indicated by arrows (A) in FIG. 2), the planet gears 223 are driven by the ring gear 224, and the sun gear 222 is driven by the planet gears 223 and rotates in a counterclockwise direction (indicated by an arrow (B) in FIG. 2). Namely, the first magnetic elements 211 rotate with respect to the coils 25 in the clockwise direction (A) while the second magnetic elements 221 rotate with respect to the coils 25 in the counterclockwise direction (B). Accordingly, a speed of relative motion of the coils 25 to the magnetic fields of the first and second magnetic elements 211, 221 is increased, and thus, a rate of change of magnetic flux through the coils 25 is relatively high. Furthermore, since an inner diameter of the ring gear 224 is greater than an outer diameter of the sun gear 222, the sun gear 222 rotates faster than the ring gear 224, and thus, the rate of change of magnetic flux through the coils 25 is further enhanced. By virtue of the above mechanical configuration, even if the wind force applied on the wind turbine 2 is weak and speed of rotation of the first and second board modules 21, 22 is low, the wind turbine system according to this disclosure can still function to generate electricity. Referring to FIG. 5, the wind turbine system can output the output electricity with the output electric power ($W_o$) at a relative high level even when wind speed is low.

In conclusion, the rectifier circuit 41 of each of the switching devices 4 according to this disclosure can rectify the electric output from a corresponding one of the coils 25 of the wind turbine 2 so as to reduce internal energy loss attributed to phase difference among the electric outputs from different coils 25, and the controller circuit 46 controls the switch circuit 43 to operate in the open state upon the input electric power ($W_i$) starts decreasing, and to operate in the closed state upon the output electric power ($W_o$) starts decreasing. Therefore, overall efficiency of power generation of the wind turbine system is optimized.

Furthermore, by virtue of the mechanical structure of the sun gear 222, the planet gear 223 and the ring gear 224 of the second board module 22, the second magnetic elements 221 disposed on the sun gear 222 rotate with respect to the coils 25 in the counterclockwise direction (B) while the first magnetic elements 211 included in the first board module 21 rotate with respect to the coils 25 in an opposite direction (i.e., the clockwise direction (A)). Further, the sun gear 222 rotates faster than the ring gear 224 and the first board module 21. Therefore, the rate of change of magnetic flux through the coils 25 is relatively high, and the wind turbine system can still function properly even if the wind force is weak.

Moreover, by virtue of the first diode 451 and the second diode 453, the output current value ($I_o$) is zero and the output electricity is blocked when the output voltage value ($V_o$) is lower than the overall voltage value ($V_{OL}$) and the threshold voltage value of the first and second diodes 451, 453, so as to prevent the overall voltage value ($V_{OL}$) from being dragged down by the output voltage value ($V_o$). In addition, the grounded capacitor 452 and the output capacitor 454 are capable of reducing ripples in the output voltage as well as the overall voltage. Therefore, the switching device 4 can stabilize the output voltage indeed.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A switching device to be connected to a wind turbine for stabilizing an electric output of the wind turbine, said switching device comprising:
    a rectifier circuit configured to be electrically connected to the wind turbine for receiving the electric output therefrom, to convert the electric output into input electricity having an input voltage value and an input current value, and to output the input electricity;
    a voltage converter circuit having an output node, and an input node that is electrically connected to said rectifier circuit for receiving the input electricity therefrom, said voltage converter circuit being configured to convert the input electricity into output electricity having an output voltage value and an output current value, and to output the output electricity via said output node;
    a switch circuit electrically connected between said output node and a ground, and being operable to switch between a closed state and an open state;
    an output interface electrically connected to said output node for outputting the output electricity; and
    a controller circuit electrically connected to said switch circuit, said input node and said output node, and configured to
        measure the input voltage value and the input current value of the input electricity, the output voltage value and the output current value of the output electricity,
        calculate an input electric power based on the input voltage value and the input current value,
        calculate an output electric power based on the output voltage value and the output current value, and
        control said switch circuit to operate in one of the closed state and the open state according to the input electric power and the output electric power.

2. The switching device of claim 1, wherein said controller circuit is configured to repeatedly calculate the input electric power when said switch circuit is in the closed state, and to control said switch circuit to switch to the open state upon a change in a rate of change of the input electric power from a positive value to a negative value.

3. The switching device of claim 2, wherein said controller circuit is configured to repeatedly calculate the input electric power at successive time points with a specific interval based on $$W_i = \int_0^T I_i(t) V_i(t) dt$$

where $W_i$ denotes the input electric power, $V_i$ denotes the input voltage value, $I_i$ denotes the input current value, and T denotes the specific interval.

4. The switching device of claim 1, wherein said controller circuit is configured to repeatedly calculate the output electric power when said switch circuit is in the open state, and to control said switch circuit to switch to the closed state upon a change in a rate of change of the output electric power from a positive value to a negative value.

5. The switching device of claim 4, wherein said controller circuit is configured to repeatedly calculate the output electric power at successive time points with a specific interval based on $$W_o = \int_0^T I_o(t) V_o(t) dt$$

where $W_o$ denotes the output electric power, $V_o$ denotes the output voltage value, $I_o$ denotes the output current value, and T denotes the specific interval.

6. The switching device of claim 1, wherein said voltage converter circuit includes an inductor.

7. The switching device of claim 6, further comprising a protection circuit that includes:
    a first diode having a cathode, and an anode electrically connected to said voltage converter circuit; and
    a second diode electrically connected between said cathode of said first diode and said output interface.

8. The switching device of claim 7, wherein said controller circuit is configured to control said switch circuit to switch between the closed state and the open state repeatedly, and to make successive instances of said switch circuit being in the closed state have durations one longer than the immediate previous when the output current value is zero until the output voltage value is above a threshold voltage value of each of the first and second diodes.

9. The switching device of claim 8, wherein said controller circuit is further configured, when the output current value is greater than zero, to:
    repeatedly calculate the input electric power when said switch circuit is in the closed state, and control said switch circuit to switch to the open state upon a change in a rate of change of the input electric power from a positive value to a negative value; and
    repeatedly calculate the output electric power when said switch circuit is in the open state, and control said switch circuit to switch to the closed state upon a change in a rate of change of the output electric power from a positive value to a negative value.

10. A wind turbine system comprising:
    a wind turbine that includes a plurality of coils, each of said coils being capable of providing an electric output; and
    a plurality of switching devices, each of said switching devices being electrically connected to a respective one of said coils for stabilizing the electric output of the respective one of said coils, each of said switching devices including
        a rectifier circuit electrically connected to the wind turbine for receiving the electric output therefrom, and configured to convert the electric output into input electricity having an input voltage value and an input current value and to output the input electricity;
        a voltage converter circuit having an output node, and an input node that is electrically connected to said rectifier circuit for receiving the input electricity therefrom, said voltage converter circuit being configured to convert the input electricity into output electricity having an output voltage value and an output current value, and to output the output electricity via said output node;
        a switch circuit electrically connected between said output node and a ground, and being operable to switch between a closed state and an open state;
        an output interface electrically connected to said output node for outputting the output electricity; and a controller circuit electrically connected to said switch circuit, said input node and said output node, and configured to measure the input voltage value and the input current value of the input electricity, the output voltage value and the output current value of the output electricity, calculate an input electric power based on the input voltage value and the input current value, calculate an output electric power based on the output voltage value and the output current value, and control said switch circuit to operate in one of the closed state and the open state according to the input electric power and the output electric power.

11. The wind turbine system of claim 10, wherein said controller circuit is configured to repeatedly calculate the input electric power when said switch circuit is in the closed state, and to control said switch circuit to switch to the open state upon a change in a rate of change of the input electric power from a positive value to a negative value.

12. The wind turbine system of claim 11, wherein said controller circuit is configured to repeatedly calculate the input electric power at successive time points with a specific interval based on $$W_i = \int_0^T I_i(t) V_i(t) dt$$

where $W_i$ denotes the input electric power, $V_i$ denotes the input voltage value, $I_i$ denotes the input current value, and T denotes the specific interval.

13. The wind turbine system of claim 10, wherein said controller circuit is configured to repeatedly calculate the output electric power when said switch circuit is in the open state, and to control said switch circuit to switch to the closed state upon a change in a rate of change of the output electric power from a positive value to a negative value.

14. The wind turbine system of claim 13, wherein said controller circuit is configured to repeatedly calculate the output electric power at successive time points with a specific interval based on $$W_o = \int_0^T I_o(t) V_o(t) dt$$

where $W_o$ denotes the output electric power, $V_o$ denotes the output voltage value, $I_o$ denotes the output current value, and T denotes the specific interval.

15. The wind turbine system of claim 10, wherein said voltage converter circuit includes an inductor.

16. The wind turbine system of claim 15, further comprising a protection circuit that includes:

a first diode having a cathode, and an anode electrically connected to said voltage converter circuit; and a second diode electrically connected between said cathode of said first diode and said output interface.

17. The wind turbine system of claim 16, wherein said controller circuit is configured to control said switch circuit to switch between the closed state and the open state repeatedly, and to make successive instances of said switch circuit being in the closed state have durations one longer than the immediate previous when the output current value is zero until the output voltage value is above a threshold voltage value of each of the first and second diodes.

18. The wind turbine system of claim 17, wherein said controller circuit is further configured, when the output current value is greater than zero, to:

repeatedly calculate the input electric power when said switch circuit is in the closed state, and control said switch circuit to switch to the open state upon a change in a rate of change of the input electric power from a positive value to a negative value; and repeatedly calculate the output electric power when said switch circuit is in the open state, and control said switch circuit to switch to the closed state upon a change in a rate of change of the output electric power from a positive value to a negative value.

19. The wind turbine system of claim 10, wherein said wind turbine further includes:

a first board module including a first board, and a plurality of first magnetic elements disposed on said first board and arranged around an axis, wherein said first elements are arranged in a manner that an imaginary line extending through two magnetic poles of each of said first magnetic elements is substantially parallel with the axis, and that any adjacent two of said first magnetic elements have respective magnetic fields with opposite directions;

a second board module being spaced apart from and aligned with said first board module along the axis, and including a plurality of second magnetic elements that are arranged around the axis, wherein said second magnetic elements are arranged in a manner that an imaginary line extending through two magnetic poles of each of said second magnetic elements is substantially parallel with the axis, and that any adjacent two of said second magnetic elements have respective magnetic fields with opposite directions; and a plurality of turbine blades attached between said first board module and said second board module, and configured to be driven by wind force to rotate said first and second board modules, wherein said coils are disposed between and do not co-rotate with said first board module and said second board module, and each of said coils has two opposite ends corresponding to said first magnetic elements and said second magnetic elements in position.

20. The wind turbine system of claim 19, wherein said wind turbine further includes a mounting board module including:

a mounting board being aligned with said second board module along the axis, and not co-rotating with said first board module and said second board module;

a sun-gear shaft disposed on said mounting board at a position through which the axis extends; and a plurality of planet-gear shafts disposed on said mounting board around said sun-gear shaft, wherein said second board module further includes a sun gear rotatably mounted on said sun-gear shaft, said second magnetic elements being disposed on said sun gear, a plurality of planet gears rotatably mounted on said planet gear shafts, respectively, and being engaged with said sun gear, and a ring gear engaged with said planet gears, said turbine blades being connected to said ring gear and configured to drive said ring gear to rotate.

* * * * *